United States Patent
Armbrust et al.

[15] 3,699,134
[45] Oct. 17, 1972

[54] PRODUCTION OF ANTHRAQUINONE
[72] Inventors: Herbert Armbrust; Hans Juergen Sturm, both of Gruenstadt; Heinz Engelbach, Limburgerhof; Hermann Wistuba, Mannheim; Armin Stoessel, Frankenthal; Richard Krabetz, Kirchheim, all of Germany
[73] Assignee: Badische Anilin- & Soda-Fabrik Aktiengesellschaft, Ludwigshafen am Rhine, Germany
[22] Filed: June 23, 1970
[21] Appl. No.: 49,166

[30] Foreign Application Priority Data
July 4, 1969   Germany..........P 19 34 063.7
Sept. 13, 1969  Germany..........P 19 46 470.1

[52] U.S. Cl.................................................260/369
[51] Int. Cl...............................................C09b 1/00
[58] Field of Search....................................260/369

[56] References Cited

OTHER PUBLICATIONS

J. Org. Chem. 72, 4918 (1950).

Primary Examiner—Lorraine A. Weinberger
Assistant Examiner—E. Jane Skelly
Attorney—Johnston, Root, O'Keeffe, Keil, Thompson & Shurtleff

[57] ABSTRACT

Production of anthraquinone by catalytic oxidation of indans with oxygen. Anthraquinone obtainable by the process is a starting material for the production of dyes and pesticides.

22 Claims, No Drawings

PRODUCTION OF ANTHRAQUINONE

It is known that anthracene can be converted into anthraquinone by oxidation with air in the presence of catalysts, for example vanadium (V) compounds, at elevated temperature (German Pat. Nos. 347,610 and 349,089, Swiss Pat. Nos. 346,212, 387,601 and 407,079, Belgian Pat. No. 594,089, Ullmanns Encyklopadie der technischen Chemie, third edition, volume 3, pages 659 to 661, Kirk-Othmer, "Encyclopedia of Chemical Technology," 2nd edition, volume 2, pages 431 to 437). In the oxidation of 1-methyl-3-phenylindan or of 1,1,3-trimethyl-3-phenylindan with chromic acid in the liquid phase, o-benzoylbenzoic acid is formed mixed with other byproducts, particularly o-acetyl-benzophenone (J.Org.Chem., 72, 4918 et seq. (1950); Berichte der Deutschen Chemischen Gesellschaft, 90, 1208 et seq. (1957).

This and other objects of the invention are achieved and anthraquinone is obtained advantageously by oxidizing an indan having the general formula:

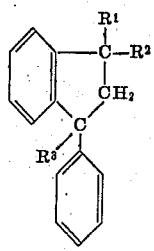

in which $R^1$, $R^2$ and $R^3$ may be identical or different and each denotes an alkyl radical, and $R^1$ and/or $R^3$ may ether or both denote a hydrogen atom with oxygen in the gas phase by a catalytic method.

When using 1-methyl-3-phenylindan the reaction may be represented by the following equation:

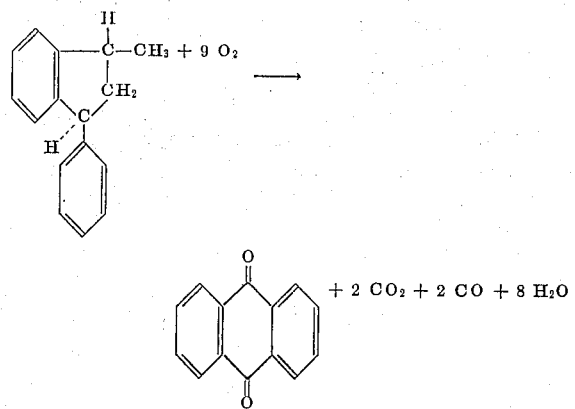

As compared with prior art methods, the process according to the invention gives anthraquinone in good yields and high purity. When 1-methyl-3-phenylindan (readily derived from styrene) is used as starting material, the process is particularly economical considering that anthracene is often obtainable only in unsatisfactory yields and technical anthracene fractions moreover contain sulfur-bearing impurities whose oxidation products poison the catalyst in a fairly short time (German Printed Application No. 1,020,617). In contrast, the raw material styrene is devoid of sulfur. Having regard to the state of the art it is surprising that no o-benzoylbenzoic acid is obtained and that anthraquinone is obtained direct from the indan in a single stage.

The indans used as starting material (I) may be prepared by dimerization of substituted or unsubstituted styrenes, for example according to the methods described in the above mentioned publications or in Rabjohn, "Organic Synthese," Collective colume IV (John Wiley Inc., New York 1963), pages 665 et seq. Preferred indans (I) are those in whose formulas $R^1$, $R^2$ and $R^3$ are identical or different and each denotes an alkyl radical having one to four carbon atoms, and $R^1$ and/or $R^3$ may also either or both denote hydrogen atoms. Examples of suitable indans (I) are: 1-methyl-3-phenylindan, 1,3-dimethyl-3-phenylindan, 1,1,3-trimethyl-3-phenylindan, 1-propyl-3-phenylindan, and 1-isobutyl-3-phenylindan.

The oxidation is carried out as a rule with excess of oxygen. A ratio of 25 to 400 moles of oxygen per mole of indan (I) beyond the stoichiometric amount is preferred. The oxygen is used as a rule in the form of air, but any mixtures of oxygen and gases which are inert under the reaction conditions such as argon, steam, nitrogen and/or carbon dioxide or flue gas may also be used. The lower explosion limit for appropriate mixtures is 20 to 60 grams of indan (I) per cubic meter of air.

Any oxidation catalysts which are suitable for oxidations with oxygen or air in the gas phase may be used. The oxidation may for example be carried out in the presence of one or more vanadium (V) compounds, preferably vanadium pentoxide and/or a vanadate. The vanadium (V) compound may be mixed with the corresponding vanadium (IV) compound. In continuous operation it is preferable to oxidize from 20 to 200, advantageously from 40 to 100, grams of starting material (I) per liter of catalyst or of catalyst and carrier per hour. The vanadium (V) catalysts may be monovanadates or polyvanadates, particularly orthovanadates, pyrovanadates or metavanadates. Among the vanadates those of the elements of groups IVa, IVb, Vb, VIIa and VIII of the Periodic System are preferred, for example iron, titanium, tin, antimony, lead and manganese vanadates. The catalysts may be used together with a carrier material, for example pumice, titanium dioxide, steatite, silicon carbide, and also iron, silicon and aluminum oxides. Similarly vanadium (V) compounds mixed with oxides of elements of main groups 4 to 8 and of subgroups 4, 5 and/or 6 of the Periodic System may also be used as catalysts for the reaction. The shape and size of the catalysts may vary within a wide range; it is advantageous to use globular, tabletted or particulate catalyst or extrudates having an average diameter of from 2 to 10 millimeters. Vanadate catalysts are prepared advantageously by precipitation of a solution of ammonium vanadate with an appropriate metal salt, for example a solution of ferric chloride, manganese sulfate or titanium tetrachloride, filtration and drying of the metal vanadate precipitate. By adding carrier material prior to or during the precipitation, the metal vanadate is at the same time finely dispersed on the carrier. The solution or suspension of the vanadate may also be applied to the carrier by spraying or soaking. It is also possible to mix the dry or moist vanadate with the carrier, if necessary to break up the mixture and then to prepare appropriate shapes, for example by means of an extruder. After the catalyst has been dried, it is advantageously calcined, for example at a temperature of from 300° to 700° C.

For the preparation of the vanadium pentoxide catalysts, for example vanadium pentoxide may be dissolved in aqueous oxalic acid or hydrochloric acid and the solution applied to a suitable carrier, for example titanium dioxide, the carrier dried and if necessary calcined. Solutions of ammonium vanadate in water may be used in an analogous manner. It is also possible to apply vanadium pentoxide together with titanium dioxide as a very thin layer, for example of less than 0.1 mm, to a spherical carrier and to prepare the catalyst in the manner described in Belgian Pat. No. 681,237.

In another advantageous embodiment catalysts are used which contain molybdenum oxide and tungsten oxide. Suitable molybdenum oxides are as a rule molybdenum pentoxide, molydenum hydroxide, molybdenum dioxide, molybdenum trioxide and molybdic acid, and suitable tungsten oxides are as a rule tungsten trioxide, tungsten dioxide, tungstic acid and wolfram blue. The catalyst may contain a mixture of two or more molybdenum oxides and/or two or more tungsten oxides instead of one oxide of each metal. It is advantageous to use catalysts having a ratio of 0.01 to 10, preferably 0.1 to 1, gram atom of molybdenum per gram atom of tungsten. The catalysts may be used together with a carrier material, for example pumice. It is advantageous to use from 15 to 150, preferably from 20 to 100, grams of starting material (I) per liter of catalyst (or catalyst on carrier) per hour for oxidation in continous operation.

The oxidation is carried out as a rule at a temperature of from 160° to 500° C, preferably from 200° to 450° C, more preferably from 250° to 400° C, at atmospheric or superatmospheric pressure, batchwise or preferably continuously. The starting material (I) may for example be oxidized in the following way: the starting indan is vaporized and mixed with a stream of air which has been heated to more than 150° C. It is also possible to saturate a slip stream of offgas devoid of oxygen with the vapor of the starting material and thus to set up the desired concentration of indan (I) in the reaction mixture. The mixture of gas and vapor is then passed through a bed of catalyst in a reactor at the reaction temperature. It is advantageous to use as the reactor a brine-cooled tubular reactor, a fluidized bed reactor with inbuilt cooling units, or a layer reactor with intermediate cooling. The end product is separated in the usual way from the reaction mixture, for example the gas leaving the reactor is passed through one or more separators in order to separate the anthraquinone from the bulk of the byproducts. Purification of the end product is possible if required, for example by dissolving it in alkaline sodium dithionite solution and filtration of the unreacted starting material. The end product is then precipitated from the filtrate by air oxidation and separated. Similarly the reaction mixture may be passed into water or dilute caustic soda solution and the end product isolated by sublimation from the solid residue thus formed.

Anthraquinone which can be prepared by the process according to this invention is a valuable starting material for the production of dyes and pesticides. Reference is made to the abovementioned publications and Ullmanns Encyklopädie der technischen Chemie, volume 3, pages 659 et seq. as regards uses of anthraquinone.

The following examples illustrate the invention. The parts given in the Examples are parts by weight. They bear the same relation to parts by volume as the kilogram to the liter.

EXAMPLE 1

Preparation of the Catalyst

Ten parts of ammonium vanadate is dissolved in 175 parts of boiling water. A solution of 7 parts of ferric chloride ($6H_2O$) in 50 parts of water is added with vigorous stirring. Immediately after the ferric chloride solution has been added, 100 parts by volume of pumice granules (2 to 3 mm in diameter) are added to the brown suspension and the mixture is evaporated to dryness. The residue in a muffle furnace for 4 hours at 400° C in a stream of air.

EXAMPLE 2

Oxidation

Twenty-one parts of the catalyst prepared in Example 1 is filled into a tubular reactor having an internal diameter of the tubes of 21 mm. A mixture of 100.000 parts by volume of air and 2.99 parts of 1-methyl-3-phenylindan is then passed through the catalyst per hour. The temperature of the wall of the tube is 362° C and the temperature in the interior of the catalyst bed is 390° C. The gaseous reaction mixture leaving the reactor is cooled to 50° C so that the end product and unreacted starting material (I) are condensed. The uncondensed portion is washed with water. After the washing water has been evaporated, the remaining residue is united with the condensate. The following results are obtained:

Starting material: 10.47 parts
Amount of offgas: 335,000 parts by volume
Carbon monoxide and carbon dioxide contained in the offgas: 1.21 % by volume = 4060 parts by volume
Crude end product: 9.55 parts.

The following are determined in the end product by ultraviolet absorption:

|  | parts |
| --- | --- |
| 52% by weight of anthraquinone | =4.96 |
| 13% by weight of phthalic anhydride | =1.24 |
| 9% by weight of unreacted starting material (I) | =0.86 |

(equivalent to a conversion of 92 percent of the theory and an anthraquinone yield of 50.8 percent of the theory based on reacted starting material (I)).

EXAMPLE 3

Production of the Catalyst

Ninety parts of titanium tetrachloride and 58 parts of vanadium pentoxide are dissolved in 400 parts by volume of concentrated hydrochloric acid. The solution is added at the same time as concentrated ammonia water to a stirred vessel charged with 200 parts of water so that the mixture thus formed is kept neutral. After precipitation, the whole is stirred for another hour at 80° C. The precipitate formed is then suction filtered, washed with water, dried for 8 hours and calcined at 500° C. Ten parts of the titanium vanadate thus prepared is suspended in water. This suspension is applied to 100 parts by volume of granules of pumic (2 to 3 millimeters diameter). The granules are dried and calcined for 4 hours at 450° C in the air.

EXAMPLE 4

Oxidation

Twenty-one parts of the catalyst prepared according to Example 3 is filled into a tubular reactor (internal diameter 21 millimeters). A mixture of 150,000 parts by volume of air and 3.43 parts of 1-methyl-3-phenylindan is passed per hour through the catalyst. The temperature of the tube wall is 350° C and the temperature in the interior of the catalyst bed is 390° C. The gaseous reaction mixture leaving the reactor is cooled to 50° C so that the end product and unreacted starting material (I) are condensed. The uncondensed portion is washed with water, the washing water is evaporated and the residue remaining is united with the condensate.

The following results are obtained:

| | |
|---|---|
| starting material (I) | 9.42 parts |
| amount of offgas | 423.000 parts by volume |
| content of carbon monoxide and dioxide in the offgas | 1.15% by volume = 4860 parts by volume |
| crude end product | 9.15 parts. |

The following are determined in the crude end product by ultraviolet absorption:

| % by weight | parts | % by weight | parts |
|---|---|---|---|
| 54 of anthraquinone | 4.94 | 0.6 of unreacted starting material (I) | 0.06 |
| 1 of phthalic anhydride | 0.095 | of benzoic acid | 0.46 |

(equivalent to a conversion of 99.4 percent of the theory and an anthraquinone yield of 52.8 percent of the theory based on reacted starting material (I).

EXAMPLE 5

Production of the Catalyst 42.0 parts of vanadium pentoxide is dissolved in 80 parts of water with an addition of 85.8 parts of oxalic acid at 80° C. 16.5 parts of 91.6 percent orthophosphoric acid is added to the solution which is made up to a total of 140 parts by volume with water. This solution is then mixed in a kneader for ninety minutes with 300 parts of titanium dioxide (anatase). The composition thus obtained is dried at 80° C, broken into 2 to 4 mm chips and calcined for 6 hours in the air at 200° C.

EXAMPLE 6

Oxidation

Seventy-five parts of the catalyst prepared according to Example 5 is filled into a tubular reactor (20 mm internal tube diameter). A mixture of 100,000 parts by volume of air and 2.56 parts of 1-methyl-3-phenylindan is passed per hour through the catalyst. The temperature of the tube wall is 300° C and the temperature in the interior of the catalyst bed is 320° C. The gaseous reaction mixture leaving the reactor is cooled to 50° C so that the end product and the unreacted starting material (I) condense. The uncondensed portion is washed with water. After the washing water has been evaporated, the residue remaining is united with the condensate.

The following results are obtained:

| | |
|---|---|
| starting material (I) | 10.24 parts |
| amount of offgas | 448.000 parts by volume |
| content of carbon monoxide and carbon dioxide in the offgas | 1.55% by volume = 6950 parts by volume |
| crude end product | 7.0 parts. |

The following are determined in the crude end product by ultraviolet absorption:

| % by weight | parts |
|---|---|
| 52 of anthraquinone | 3.64 |
| 3.8 of unreacted starting material (I) | 0.27 |

(equivalent to a conversion of 97 percent of the theory and an anthraquinone yield, based on reacted starting material (I), of 36.5 percent of the theory).

EXAMPLE 7

Production of the Catalyst

Six parts of vanadium pentoxide and 94 parts of titanium dioxide are mixed in a ball mill. This mixture is applied as thin layer to steatite balls having a diameter of from 5 to 6 millimeters. A coated ball contains about 6 parts of vanadium pentoxide and titanium dioxide.

EXAMPLE 8

Oxidation 153 parts of the catalyst prepared according to Example 7 is filled into a tubular reactor (20 mm internal diameter). A mixture of 100,000 parts by volume of air and 4.38 parts of 1-methyl-3-phenylindan is passed per hour through the catalyst. The temperature of the tube wall is 350° C. The gaseous reaction mixture leaving the reactor is cooled to 50° C and worked up as described in Example 6.

The following results are obtained:

| | |
|---|---|
| starting material (I) | 17.52 parts |
| amount of offgas | 412.000 parts by volume |
| content of carbon monoxide and 2.3% by volume = | |
| carbon dioxide in offgas | 9500 parts by volume |
| crude end product | 14.3 parts |

The following are determined in the crude end product by ultraviolet absorption:

| % by weight | parts |
|---|---|
| 40 of anthraquinone | 5.72 |
| 13 of 1-methyl-3-phenylindan | 1.86. |

(equivalent to a conversion of 89 percent of the theory and an anthraquinone yield, based on reacted starting material (I), of 36.5 percent of the theory).

EXAMPLE 9

Production of the Catalyst 11.3 parts of tin(II) chloride (2H$_2$O) is dissolved in 10 parts of water with the addition of a few drops of concentrated hydrochloric acid. A solution of 11.7 parts of ammonium vanadate in 200 parts of hot water is added with vigorous stirring. Immediately after the ammonium vanadate solution has been added, 100 parts by volume of granular pumice (2 to 3 mm diameter) is introduced into the suspension and the mixture is evaporated to dryness. The residue is dried for 1 hour at 125° C and then calcined in the air for 4 hours at 450° C.

EXAMPLE 10

Oxidation

Twenty-two parts of the catalyst prepared according to Example 9 is filled into a tubular reactor (21 mm internal diameter). A mixture of 200,000 parts by volume of air and 3.19 parts of 1-methyl-3-phenylindan is then passed through the catalyst. The tube wall temperature is 330° C and the temperature in the interior of the catalyst bed is 365° C. The gaseous reaction mixture leaving the reactor is cooled to 50° C so that the end product and the unreacted starting material (I) are condensed. The uncondensed portion is washed with water, the washing water is evaporated and the residue which remains is united with the condensate.

The following results are obtained:

| | |
|---|---|
| starting material (I) | 51.06 parts |
| amount of offgas | 3,585,000 parts by volume |
| content of carbon monoxide and carbon dioxide in the offgas | 1.0% by volume = 35.850 parts by volume |
| crude end product | 41.84 parts. |

The following are determined in the crude end product by ultraviolet absorption:

| % by weight | parts |
|---|---|
| 41 of anthraquinone | 17.15 |
| 16 of phthalic anhydride | 6.7 |
| 7.7 of unreacted starting material (I) | 3.22 |
| 4 of benzoic acid | 1.67 |

(equivalent to a conversion of 93.5 percent of the theory and an anthraquinone yield, based on reacted starting material (I), of 35.9 percent of the theory).

EXAMPLE 11

Production of the Catalyst

Eleven parts of ammonium vanadate is dissolved in 200 parts of boiling water and then a solution of 14 parts of antimony trichloride in 5 parts of water is added with vigorous stirring. Immediately after the antimony trichloride solution has been added, 100 parts by volume of pumice granules (2 to 3 mm diameter) are added to the suspension and the mixture is evaporated to dryness. The residue is dried for 1 hour at 125° C and then calcined in the air for 4 hours at 400° C.

EXAMPLE 12

Oxidation

Twenty-one parts of the catalyst prepared according to Example 11 is filled into a tubular reactor (21 mm internal diameter). A mixture of 100,000 parts by volume of air and 2.24 parts of 1-methyl-3-phenylindan is passed per hour through the catalyst. The tube wall temperature is 337° C and the temperature in the interior of the catalyst bed is 390° C. The gaseous reaction product leaving the reactor is cooled to 50° C and further worked up as described in Example 10.

The following results are obtained:

| | |
|---|---|
| starting material (I) | 9.5 parts |
| amount of offgas | 465,000 parts by volume |
| content of carbon monoxide and carbon dioxide in the offgas | 2.1% by volume = 9,700 parts by volume |
| crude end product | 5.78 parts. |

The following are determined in the crude end product by ultraviolet absorption:

| % by weight | parts |
|---|---|
| 40 of anthraquinone | 2.31 |
| 29 of phthalic anhydride | 1.68 |
| 0 of unreacted starting material (I) | 0 |

(equivalent to a conversion of 100 percent of the theory and an anthraquinone yield, based on reacted starting material (I), of 24.3 percent of the theory).

EXAMPLE 13

Production of the Catalyst 11.7 parts of ammonium vanadate is dissolved in 200 parts of boiling water. A solution of 9.9 parts of zinc nitrate (6 $H_2O$) in 20 parts of water is added thereto with vigorous stirring. Immediately afterwards, 100 parts by volume of pumice granules are stirred into the suspension and the mixture is evaporated to dryness. The residue is dried and calcined for 4 hours at 450° C.

EXAMPLE 14

Oxidation

Twenty-one parts of the catalyst prepared according to Example 13 is filled into a tubular reactor (21 mm internal tube diameter). A mixture of 260,000 parts by volume of air and 3.16 parts of 1-methyl-3-phenylindan per hour is passed through the catalyst. The tube wall temperature is 365° C and the temperature in the interior of the bed of catalyst is 390° C. The gaseous reaction mixture leaving the reactor is cooled to 50° C so that the end product and unreacted starting material (I) condense. Uncondensed constituents are washed with water, the washing water is evaporated and the residue remaining is united with the condensate.

The following results are obtained:

| | |
|---|---|
| starting material (I) | 9.48 parts |
| amount of offgas | 651.000 parts by volume |
| content of carbon monoxide and carbon dioxide in the offgas | 0.67% by volume = 4360 parts by volume |
| crude end product | 7.17 parts |

The following are determined in the crude end product by ultraviolet absorption:

| % by weight | parts |
|---|---|
| 60 of anthraquinone | 4.3 |
| 1.2 of unreacted starting material (I) | 0.09 |

(equivalent to a conversion of 99.1 percent of the theory and an anthraquinone yield, based on reacted starting material (I) of 45.8 percent of the theory).

EXAMPLE 15

Production of the Catalyst 11.7 parts of ammonium vanadate is dissolved in 200 parts of boiling water. A solution of 10.28 parts of cadmium nitrate ($4H_2O$) in 20 parts of water is added with vigorous stirring. One hundred parts by volume of pumice granules are stirred into the suspension and the mixture is evaporated to dryness. The residue is dried and calcined for 4 hours at 450° C.

EXAMPLE 16

Oxidation

Twenty-six parts of the catalyst prepared according to Example 15 is filled into a tubular reactor (20 mm internal diameter of the tube). A mixture of 182,000 parts by volume of air and 3.21 parts of 1-methyl-3-phenylindan per hour is passed through the catalyst. The tube wall temperature is 360° C and the temperature in the interior of the catalyst bed is 405° C. The gaseous reaction mixture leaving the reactor is cooled to 50° C so that the end product and unreacted starting material (I) condense. The uncondensed portion is washed with water, the washing water is evaporated and the residue which remains is united with the condensate.

The following results are obtained:

| | |
|---|---|
| starting material (I) | 8.82 parts |
| amount of offgas | 546,000 parts by volume |
| content of carbon monoxide and carbon dioxide in the offgas | 1.0% by volume = 5.460 parts by volume |
| crude end product | 6.93 parts |

The following are determined in the crude end product by ultraviolet absorption:

| % by weight | parts |
|---|---|
| 54 of anthraquinone | 3.74 |
| 3.5 of unreacted starting material (I) | 0.24 |

(equivalent to a conversion of 97.3 percent of the theory and an anthraquinone yield, based on reacted starting material (I), of 43.6 percent of the theory).

EXAMPLE 17

Production of the Catalyst

Vanadium pentoxide is melted in a crucible and poured in a thin jet onto carbon dioxide snow. The solid formed is broken up into granules having a diameter of 1.5 to 3 mm.

EXAMPLE 18

Oxidation

Seventy parts of the catalyst prepared according to Example 17 is filled into a tubular reactor (20 mm internal tube diameter). A mixture of 100,000 parts by volume of air and 2.39 parts of 1-methyl-3-phenylindan per hour is passed through the catalyst. The tube wall temperature is 405° C and the temperature in the interior of the catalyst bed is also 405° C. The gaseous reaction mixture leaving the reactor is cooled to 50° C so that end product and unreacted starting material (I) condense. The uncondensed portion and the residue which remains is united with the condensate.

The following results are obtained:

| | |
|---|---|
| starting material (I) | 7.17 parts |
| amount of offgas | 334.000 parts by volume |
| content of carbon monoxide and carbon dioxide in the offgas | 1.16% by volume = 3876 parts by volume |
| crude and product | 6.14 parts |

The following are determined in the crude end product by ultraviolet absorption:

| % by weight | parts |
|---|---|
| 59 of anthraquinone | 3.62 |
| 0.5 of unreacted starting material (I) | 0.03 |

(equivalent to a conversion of 99.6 percent of the theory and an anthraquinone yield, based on reacted starting material (I), of 50.7 percent of the theory).

EXAMPLE 19

Production of the Catalyst

Forty-three parts of molybdic acid ($H_2MoO_4$ and 133 parts of tungstic acid ($H_2WO_4$) are ground for 2 hours in a ball mill and then calcined under nitrogen in a muffle furnace for 4 hours at 220° C, then for 3 hours at 300° C and then for 16 hours at 600° C. The calcined mixture is made into a paste with water, dried and calcined for 1 hour at 400° C. The calcined mixture is then broken up into chips having a particle size of 1.5 to 3 mm diameter.

EXAMPLE 20

Oxidation

Forty-eight parts by volume of the catalyst prepared according to Example 19 is filled into a tubular reactor (21 mm internal tube diameter). A mixture of 100,000 parts by volume of air and 4.16 parts of 1-methyl-3-phenylindan is passed per hour through the catalyst. The tube wall temperature is 350° C and the temperature in the interior of the catalyst bed is 420° C. The gaseous reaction mixture leaving the reactor is cooled to 50° C so that end product and unreacted 1-methyl-3-phenylindan condense. The uncondensed portion is washed with water, the washing water is evaporated and the residue which remains is united with the condensate.

The following results are obtained:

| | |
|---|---|
| 1-methyl-3-phenylindane used | 37.45 parts |
| amount of offgas | 942.000 parts by volume |
| content of carbon monoxide and carbon dioxide in the offgas | 3.3% by volume = 3500 parts by volume |
| crude end product | 22.8 parts |

The following are determined in the end product by ultraviolet absorption:

| | |
|---|---|
| 42% of anthraquinone (by weight) | 9.58 parts |
| 37% of phthalic anhydride | 8.44 parts |
| 2.8% of 1-methyl-3-phenylindan | 0.64 part |

The conversion is equivalent to 97 percent of the theory. The yield of end product, based on reacted 1-methyl-3-phenyl-indan, is 26 percent.

EXAMPLE 21

Production of the Catalyst 1.75 parts of molybdic acid ($H_2MoO_4$) and 8.15 parts of tungstic acid ($H_2WO_4$) are dissolved in 15 parts by volume of concentrated aqueous ammonia solution and 130 parts by volume of water. A solution of 4.4 parts of iron nitrate (Fe(NO$_3$)$_3$·9H$_2$O) in 50 parts by volume of water and also 100 parts by volume of pumice granules (diameter 1.5 to 3 mm) are added to the said solution. The mixture is evaporated to dryness and the residue is then calcined for 4 hours at 400° C.

EXAMPLE 22

Oxidation

Seventy parts by volume of the catalyst prepared according to Example 21 is filled into a tubular reactor (internal tube diameter 21 mm). A mixture of 100,000 parts by volume of air and 2.4 parts of 1-methyl-3-phenylindan is passed per hour through the reactor. The tube wall temperature is 415° C and the temperature in the interior of the catalyst bed is 427° C. The gaseous reaction mixture leaving the reactor is further treated as described in Example 20.

The following results are obtained:

| | |
|---|---|
| 1-methyl-3-phenylindan used | 16.81 parts |
| amount of offgas | 720,000 parts by volume |
| content of carbon monoxide and carbon dioxide in the offgas | 1.2% by volume = 8640 parts by volume |
| crude end product | 12.77 parts |

The following are determined in the end product by ultraviolet absorption:

| | |
|---|---|
| 40% by weight of anthraquinone | 5.11 parts |
| 4% by weight of phthalic anhydride | 0.51 parts |
| 6.7% by weight of 1-methyl-3-phenylindan | 0.86 parts |

(equivalent to a conversion of 95 percent of the theory and a yield of end product of 30.4 percent of the theory based on reacted 1-methyl-3-phenyl-indan).

We claim:

1. A process for the production of anthraquinone which comprises catalytically oxidizing with oxygen in the gas phase in the presence of a vanadium (V) compound as a catalyst in the presence of a catalyst of molybdenum oxide and tungsten oxide an indan having the formula

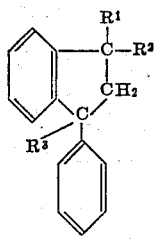

(I)

in which R$^1$, R$^2$ and R$^3$ may be identical or different and each denotes an alkyl radical, and R$^1$ and/or R$^3$ may also either or both denote a hydrogen atom.

2. A process as in claim 1 wherein the catalyst is a vanadium (V) compound.

3. A process as in claim 1 wherein the catalyst is vanadium pentoxide.

4. A process as in claim 1 wherein the catalyst is molybdenum oxide and tungsten oxide.

5. A process as claimed in claim 1 carried out with a ratio of 25 to 400 moles of oxygen per mole of indan (I) beyond the stoichiometric amount.

6. A process as claimed in claim 1 carried out with 20 to 200 grams of indan (I) per liter of catalyst per hour.

7. A process as claimed in claim 1 carried out with 20 to 200 grams of indan (I) per liter of catalyst on carrier per hour.

8. A process as claimed in claim 1 carried out with 40 to 100 grams of indan (I) per liter of catalyst per hour.

9. A process as claimed in claim 1 carried out with 40 to 100 grams of indan (I) per liter of catalyst on carrier per hour.

10. A process as claimed in claim 4 carried out with a catalyst containing 0.1 to 1 gram atom of molybdenum per gram atom of tungsten.

11. A process as claimed in claim 1 carried out with 20 to 100 grams of indan (I) in continuous operation per liter of catalyst per hour.

12. A process as claimed in claim 1 carried out with 20 to 100 grams of indan (I) per liter of catalyst on carrier per hour in continuous operation.

13. A process as claimed in claim 1 carried out at a temperature of from 200° to 450° C.

14. A process as claimed in claim 1 carried out at a temperature of from 250° to 400° C.

15. A process as in claim 1 carried out at a temperature of at least 160° C.

16. A process as in claim 1 carried out at a temperature of from 160° to 500° C.

17. A process as in claim 1 wherein said alkyl radical has from one to four carbon atoms.

18. A process as in claim 1 wherein said indan I is 1-methyl-3-phenylindan.

19. A process as in claim 1 wherein said indan I is 1,3-dimethyl-3-phenylindan.

20. A process as in claim 1 wherein said indan I is 1,1,3-trimethyl-3-phenylindan.

21. A process as in claim 1 wherein said indan I is 1-propyl-3-phenylindan.

22. A process as in claim 1 wherein said indan I is 1-isobutyl-3-phenylindan.

* * * * *

UNITED STATES PATENT OFFICE
CERTIFICATE OF CORRECTION

Patent No. 3,699,134      Dated October 17, 1972

Inventor(s) HERBERT ARMBRUST, HANS JUERGEN STURM, HEINZ ENGELBACH, HERMANN WISTUBA, ARMIN STOESSEL & RICHARD KRABETZ It is certified that error appears in the above-identified patent and that said Letters Patent are hereby corrected as shown below:

Column 11, line 43, after "catalyst", first occurrence, insert -- or --.

Signed and sealed this 18th day of December 1973.

(SEAL)
Attest:

EDWARD M. FLETCHER, JR.
Attesting Officer

RENE D. TEGTMEYER
Acting Commissioner of Patents